United States Patent
Beers et al.

(10) Patent No.: US 11,477,945 B2
(45) Date of Patent: Oct. 25, 2022

(54) HORTICULTURE LIGHTING DEVICE (71) Applicant: CURRENT LIGHTING SOLUTIONS, LLC, East Cleveland, OH (US)

(72) Inventors: William Winder Beers, Chesterland, OH (US); William Erwin Cohen, Solon, OH (US); Alok Srivastava, Niskayuna, NY (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 113 days.

(21) Appl. No.: 16/816,623

(22) Filed: Mar. 12, 2020

(65) Prior Publication Data
US 2020/0288642 A1   Sep. 17, 2020

Related U.S. Application Data (60) Provisional application No. 62/817,675, filed on Mar. 13, 2019.

(51) Int. Cl.
*A01G 7/04* (2006.01)
*A01G 9/24* (2006.01)
*H01J 61/44* (2006.01)

(52) U.S. Cl.
CPC ............ *A01G 7/045* (2013.01); *A01G 9/249* (2019.05); *H01J 61/44* (2013.01)

(58) Field of Classification Search
CPC .......... A01G 7/045; A01G 9/249; H01J 61/44
See application file for complete search history.

(56) References Cited

U.S. PATENT DOCUMENTS

| | | | |
|---|---|---|---|
| 5,140,449 A * | 8/1992 | Sluzky | C09K 11/7792 345/11 |
| 9,504,207 B2 | 11/2016 | Onuma et al. | |
| 9,516,818 B2 | 12/2016 | Aikala | |
| 2012/0224353 A1 | 9/2012 | Winkler et al. | |
| 2013/0221838 A1 | 8/2013 | Oshio | |
| 2016/0000018 A1 | 1/2016 | Van Elmpt | |
| 2018/0298280 A1 | 10/2018 | Zych et al. | |
| 2018/0323349 A1 | 11/2018 | Kim et al. | |
| 2020/0232003 A1* | 7/2020 | Kuehnle | A61K 8/345 |

FOREIGN PATENT DOCUMENTS

| | | |
|---|---|---|
| EP | 2943056 A1 | 8/2017 |
| KR | 20100110757 A * | 10/2010 |
| WO | 2011117791 A1 | 9/2011 |

OTHER PUBLICATIONS

International Search Report and Written Opinion dated Jun. 26, 2020 which was issued in connection with PCT Application No. PCT/US2020/022280 which was filed Mar. 12, 2020.

* cited by examiner

*Primary Examiner* — Monica L Barlow
(74) *Attorney, Agent, or Firm* — Buckley, Maschoff & Talwalkar LLC (57) ABSTRACT

A lighting device is presented. The lighting device includes an LED light source; and a red/far-red emitting phosphor radiationally coupled to the LED light source, wherein the red/far-red emitting phosphor comprises a host material activated with an activator ion, and wherein the activator ion comprises at least one of $Sm^{2+}$ and $Mn^{2+}$. Numerous other aspects are provided.

19 Claims, 6 Drawing Sheets

FIG. 7

HORTICULTURE LIGHTING DEVICE

CROSS REFERENCE TO RELATED APPLICATION

The present application claims priority from the following U.S. Provisional Patent Application, which is hereby incorporated by reference herein in its entirety for all purposes: U.S. Provisional Patent Application Ser. No. 62/817,675, filed Mar. 13, 2019, and entitled "HORTICULTURE LIGHTING DEVICES".

BACKGROUND

Greenhouses commonly use artificial supplemental light to encourage or promote plant growth. Typical types of greenhouse lighting systems include incandescent lights, fluorescent lights, and various high-intensity discharge (HID) lamps, including high-pressure sodium (HPS) lights, metal halide lights, and mercury vapor lights. However, these lighting systems are heavy and need to be placed far above the plants. Additionally, these lighting systems have many other drawbacks including, but not limited to limited efficiency, short life and unwanted emissions (radiated heat).

It would be desirable to provide systems and methods for improved horticultural lighting.

SUMMARY

According to some embodiments, a lighting device includes an LED light source; and a red/far-red emitting phosphor radiationally coupled to the LED light source, wherein the red/far-red emitting phosphor comprises a host material activated with an activator ion, and wherein the activator ion comprises at least one of $Sm^{2+}$ and $Mn^{2+}$.

According to some embodiments, a lighting device includes an LED light source; and a phosphor radiationally coupled to the LED light source, wherein the phosphor comprises a host material activated with $Sm^{2+}$.

The disclosure relates generally to lighting devices for horticulture. More particularly, the disclosure relates to horticulture lighting devices employing red/far-red emitting phosphors, applicable to plant growth. Some technical effects of some embodiments disclosed herein are an improved lighting device including red/far-red emitting phosphors, that provides improved red/far-red light in a broad spectrum (from about 600 nm to about 800 nm) for plant growth.

With this and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. For example, the term, "about" used in context of a wavelength value may refer to a value of a wavelength up to ±20 nm of the specified wavelength value, and is applicable to all incidences of the term "about" as used herein for a wavelength value throughout the specification.

As used herein, the term "phosphor" or "phosphor material" or "phosphor composition" may be used to denote both a single phosphor composition as well as a blend of two or more phosphor compositions. As used herein, the term "lamp" or "lighting device" or "lighting system" refers to any source of visible and/or ultraviolet light which may be generated by at least one light emitting element producing a light emission when energized (for example, a phosphor material) by a light emitting diode.

As used herein, the term "red/far-red emitting phosphor" refers to a phosphor that has an emission spectrum having peak emission beyond 600 nm. In some embodiments, the red/far-red emitting phosphor emits light in a wavelength range from about 600 nm to about 800 nm. In certain embodiments, the red/far-red emitting phosphor may have peak emission at a wavelength in a range from about 600 nm to about at least 750 nm.

As used herein, the term "activator" or "activator ion" refers to an ion (for example $Sm^{2+}$, $Cr^{3+}$) doped in a host material that forms a luminescent center and is responsible for the luminescence of a phosphor. A concentration of an activator ion in a phosphor may range from about 1 atomic percent to 50 atomic percent, relative to the atom(s) which may be substituted with the activator ion. In some embodiments, an activator ion may act as a sensitizer. As used herein, the term "sensitizer" refers to an ion that absorbs radiation from a light source and transfers it to the activator ion that emits the desired photons. The amount of sensitizer in a phosphor may range from 1 atomic percent to 100 atomic percent, relative to the amount of the activator ion.

The terms "substitution" and "doping" refer to adding an amount of an element in a material. Typically, an element in a material is partially or fully replaced by another element on such addition. For example, in $BaAlF_5Sm^{2+}$, samarium is doped in $BaAlF_5$. As understood by those skilled in the art, this type of notation means that the phosphor includes the composition $Ba_{1-x}Sm_xAlF_5$, where x can vary from greater than 0.0, to 0.5.

Regarding the use of artificial supplemental light in greenhouses to encourage or promote plant growth, the use of phosphor coated light emitting diodes (LEDs) has been conventionally used. These phosphor coated LEDs may tailor light at a specific wavelength to particularly target plant growth phases, as well as to increase the amount of light absorbed by the plants. LEDs may provide advantages over conventional lamps, such as higher efficiency, longer life, the production of relatively little radiated heat resulting in the LED being placed relatively closer to plants.

Figure 6:
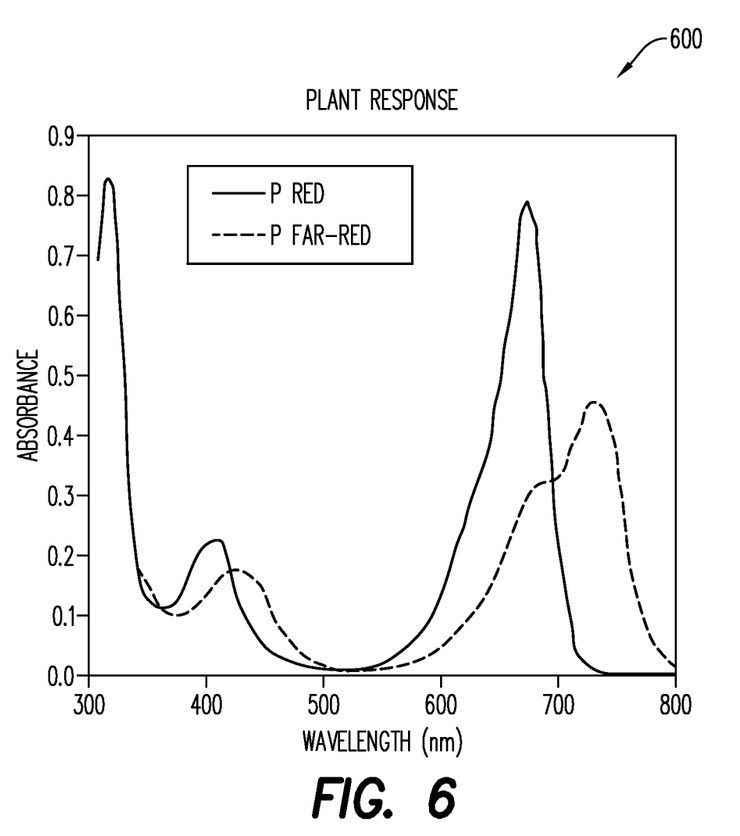
FIG. 6 is a graph showing plant responsiveness to red/far-red wavelengths

With respect to phosphors that may be used to coat the LED, the phosphors emitting at wavelengths greater than 650 nanometers (nm), and therefore in the red range (i.e., 650-850 nm), are typically not efficient photon generators for use in general illumination. This is because the spectrum of such phosphors may make a poor match with the human eye response (luminosity response function), resulting in low brightness detection, even when the quantum efficiency of the phosphor is high. However, both the red region (600-700 nm) and the far-red region (i.e., 625 nm-at least 750 nm), as shown in the graph 600 in FIG. 6, of the color spectrum generated by red emitting phosphors may be important for plants. For example, an important family of plant photoreceptors is the phytochromes ("PHY") that sense light and are activated by the red wavelengths in the 630-660 nm range and the far-red wavelengths in the 700-740 nm, and more particularly, in the 725-735 nm range, in a given spectrum. The red wavelengths may encourage (or regulates) stem growth, flowering and fruit production, as well as chlorophyll production, while the far-red wavelengths may mediate seed germination, increase extension growth (e.g., increase size of leaves, length of stems), chlorophyll usage, etc. The balance of red to far-red wavelengths may be critical in nature and controlled environment agriculture as the balance regulates processes ranging from seed germination, height, leaf expansion, branching, plant immunity, circadian rhythm, etc.

Typical red LEDs may provide wavelengths in either the red or the far-red region. Specifically, the far-red LEDs are not very efficient and are not widely available. Additionally, typical red LEDs provide wavelengths in either the red region or the far-red region, and not both.

To resolve these problems, one or more embodiments provide a horticulture lighting device that includes an LED light source and a red/far-red emitting phosphor that is radiationally coupled to the LED light source.

The red/far-red emitting phosphor as described in embodiments may absorb radiation in the spectrum from a UV region to a visible region (a wavelength range between about 250 nm and about 500 nm) and emit light in a wavelength range from 600 nm to about 800 nm. The red/far-red emitting phosphors may, in one or more embodiments, be used in a lighting device to generate far-red light suitable for plant growth for example, in a greenhouse. In some embodiments, these red/far-red emitting phosphors may be used in combination with other phosphors (in a blend) to produce desired white light for plant growth.

The red/far-red emitting phosphor includes a host material activated with an activator ion. The composition of the red/far-red emitting phosphor host material may be formed by conventional solid state reaction techniques in which, usually, the starting materials of the intended composition are accurately weighed, mixed (such as by a ball mill) and heated at a temperature for a duration under appropriate atmosphere (such as $H_2$—$N_2$ forming gas). The host material includes, but is not limited to at least one of, an oxide (including phosphates, borates, silicates, tungstates, etc.), a fluoride, an oxyfluoride, a nitride, an oxynitride, a sulfide, an oxysulfide, selenide, an oxyselenide, chlorides, bromides, oxyhalides, iodides, other suitable halides, glass (such as fluoride or oxide glasses) or a combination thereof. In some embodiments, the host material is selected from the group consisting of an oxide, a fluoride, an oxyfluoride and combinations thereof. In some embodiments, the host material is an oxide. In other embodiments, the host material is a fluoride.

The activator ion may be a transition metal ion or a rare earth ion, including, but not limited to, at least one of $Sm^{2+}$, $Mn^{2+}$, $Mn^{4+}$, $Eu^{2+}$, $Cr^{3+}$ or a combination thereof. In one or more embodiments, the red/far-red emitting phosphor includes a fluoride-based host material activated with at least one of $Sm^{2+}$, $Mn^{2+}$, $Mn^{4+}$, $Eu^{2+}$, $Cr^{3+}$ or a combination thereof. In one or more embodiments, the red/far-red emitting phosphor includes an oxide-based host material activated with at least one of $Sm^{2+}$, $Mn^{2+}$, $Mn^{4+}$, $Eu^{2+}$, $Cr^{3+}$ or a combination thereof. Examples include, but are not limited to, $Sm^{2+}$ activated $BaAlF_5$ ($BaAlF_5:Sm^{2+}$), and $Cr^{3+}$ activated alumina ($Al_2O_3$).

In some embodiments, the activator ion includes at least two of $Sm^{2+}$, $Mn^{2+}$, $Mn^{4+}$, $Eu^{2+}$, $Cr^{3+}$. That is, the host material is activated with at least two of $Sm^{2+}$, $Mn^{2+}$, $Mn^{4+}$, $Eu^{2+}$, $Cr^{3+}$. In some embodiments, the activator ion includes $Eu^{2+}$, and one or more of $Sm^{2+}$, $Mn^{2+}$, $Mn^{4+}$, $Cr^{3+}$. In some embodiments, the host material is activated with $Eu^{2+}$ and $Mn^{2+}$. In these instances, the $Eu^{2+}$ may act as a sensitizer and $Mn^{2+}$ may act as an activator. In some embodiments, the host material is activated with $Eu^{2+}$ and $Sm^{2+}$. In these instances, the $Eu^{2+}$ may act as a sensitizer and $Sm^{2+}$ may act as an activator. In some embodiments, the host material is activated with $Cr^{3+}$ and $Mn^{4+}$. In these instances, the $Mn^{4+}$ may act as a sensitizer and $Cr^{3+}$ may act as an activator.

Figure 1:
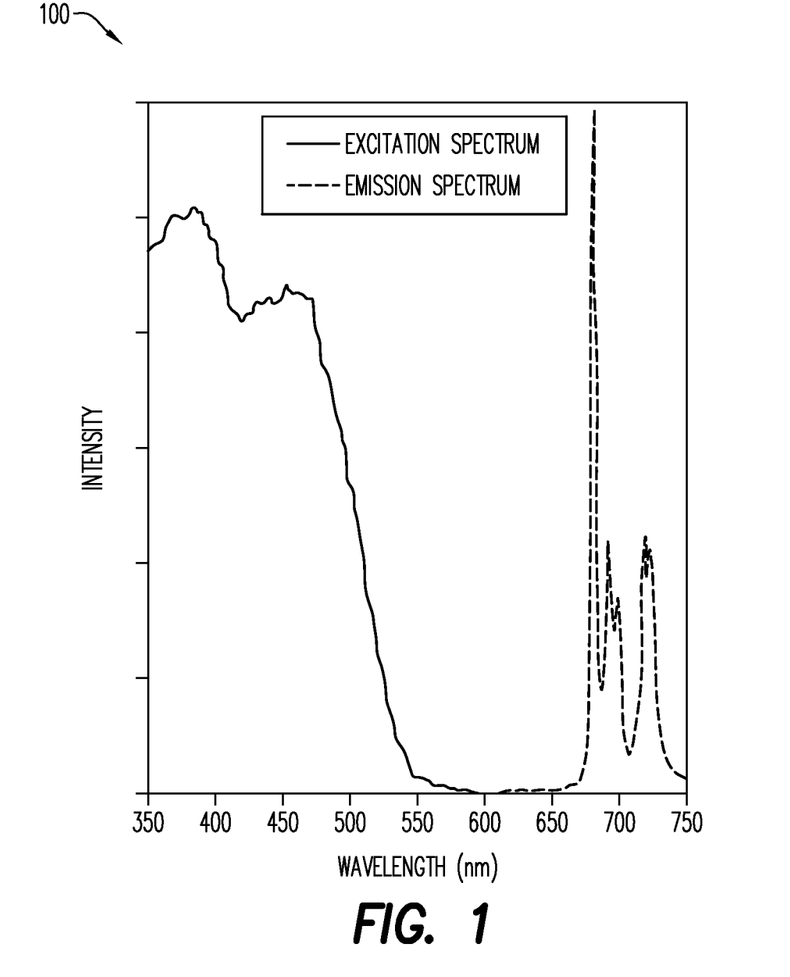
FIG. 1 is a graph showing a non-exhaustive example of excitation and emission spectra.

While the non-exhaustive examples described herein will be described with respect to divalent samarium (Sm) ions ($Sm^{2+}$), and in particular a phosphor including a fluoride-based host material activated with $Sm^{2+}$, other suitable host materials and ions may be used. The inventors note that the use of these red/far-red emitting phosphors including the activator ions may produce an emission spectrum in a relatively broader wavelength range from 600 nm to about 800 nm, as compared to conventional far-red emitting phosphors that produce an emission spectrum of 700-740 nm. The inventors note that the use of the $Sm^{2+}$ as the activator ion may be beneficial in that the use of $Sm^{2+}$ in the red/far-red emitting phosphor produces an emission spectrum in a range of about 650-750 nm, which includes the wavelength ranges most beneficial to the plants (i.e., red wavelengths in the 650-670 nm range and the far-red wavelengths in the 700-740 nm, and more particularly, in the 725-735). Further, the $Sm^{2+}$ emits these wavelengths in a concentrated manner, as $Sm^{2+}$ does not emit wavelengths outside of this range that are not useful to the plants. The peak emission of the red/far-red emitting phosphor, described by one or more embodiments, exists at a wavelength in a range from about 650 nm to about 740 nm, a range from about 650 nm to about 720 nm, and a range from about 660 nm to about 700 nm. FIG. 1 provides a graph 100 showing excitation (continuous line) and emission spectra (dotted line) of $BaAlF_5$:$Sm^{2+}$, for example.

Moreover, the red/far-red emitting phosphor of embodiments described herein, generally has a high quantum efficiency (>50 percent). In some embodiments, the red/far-red emitting phosphor has a quantum efficiency greater than 70 percent. In some embodiments, the red/far-red emitting phosphor has a quantum efficiency in a range from about 75 percent to about 90 percent. Furthermore, these phosphors may have their quantum efficiency maintained at the elevated temperatures of LED operations. The term, "about" used in context of quantum efficiency refers to a value of a quantum efficiency up to ±5 percent of the specified quantum efficiency value. The quantum efficiency is the quantity (number) of photons emitted from the phosphor as the function of the amount or quantity (number) of stimulating photons at a particular wavelength. As used herein, the quantum efficiency is defined as the ratio of the number of red/far red photons emitted to the number of 450 nm photons absorbed by the phosphor. High quantum efficiency is required in order to maximize the number of photons emitted by the phosphor.

The term "radiationally coupled", as used herein, means that radiation from the LED light source is transmitted to a phosphor and the phosphor emits radiation of a different wavelength. A combination of the light from the LED light source and the light emitted from the phosphor may be used to produce a desired color emission or white light. For example, a lighting device may be based on a blue emitting InGaN LED chip and a phosphor or a blend of phosphors to convert at least some of the blue radiation to another color, e.g. a red emission or a white emission.

Additionally, one or more embodiments may include an LED light source that emits a wavelength in a range of from about 400-500 nm and may be referred to herein as a "blue" LED. LEDs emitting other suitable wavelengths may be used, as a non-exhaustive example from 350-625 nm. The inventors note that the use of a blue LED with the phosphor may be more efficient to generate red/far-red wavelengths than using a red LED, as the power conversion efficiency of a blue LED is superior to the power conversion efficiency of a red LED. The phosphor converted blue LED can simultaneously stimulate the red and far-red plant receptors thereby eliminating the need for two LEDs emitting near 670 nm and 730 nm, respectively. It simplifies fixture design and reduces cost. Particular application is described, herein, in conjunction with converting LED-generated ultraviolet (UV), violet, green or blue radiation into a desired color light for horticulture applications. It should be appreciated, however, that the invention is also applicable to the conversion of radiation from UV, violet, green, and/or blue lasers, as well as other light sources, to white light.

Figure 2:
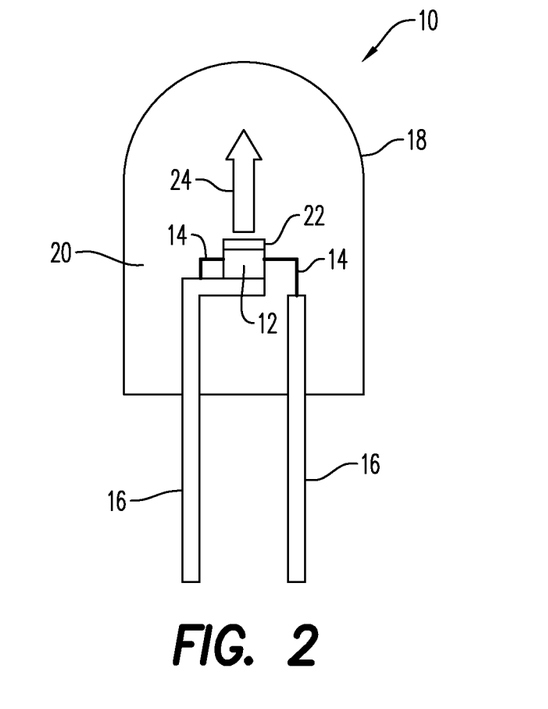
FIG. 2 is a first non-exhaustive example of a lighting device according to some embodiments.
Figure 3:
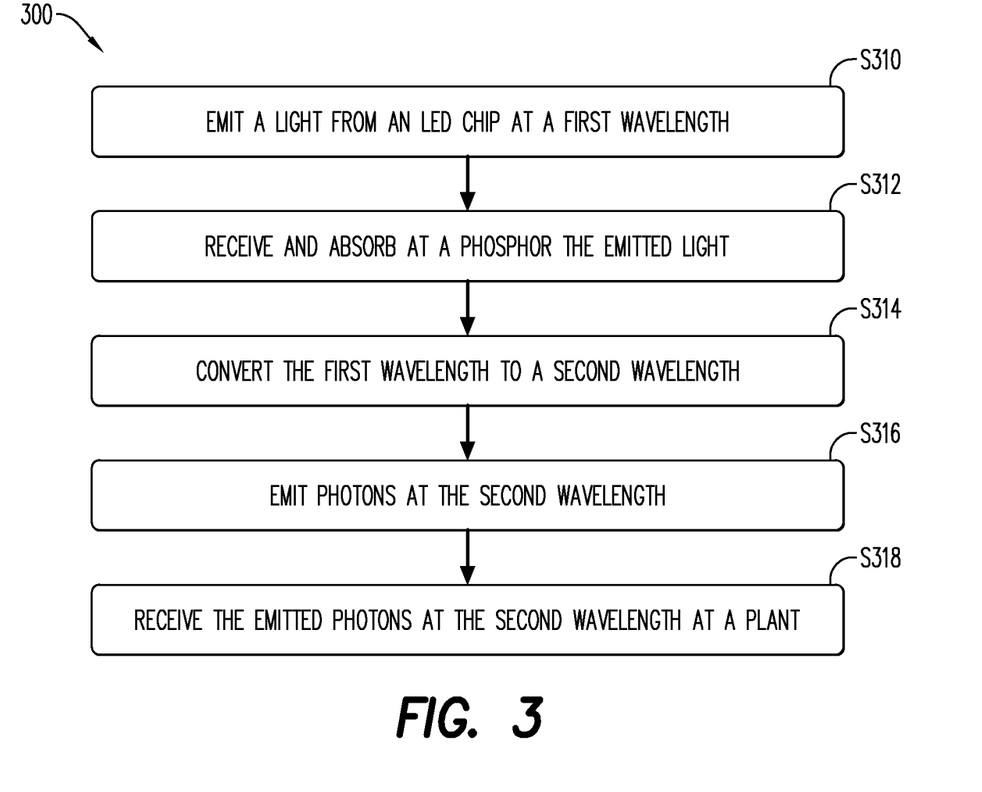
FIG. 3 is a method according to some embodiments.

Turning to FIGS. 2-5, examples of a lighting device 10 (FIGS. 2, 4, 5) and diagrams of examples of operation according to some embodiments are provided. In particular, FIG. 3 provides a flow diagram of a process 300, according to some embodiments. Process 300, and any other process described herein, may be performed using any suitable combination of hardware (e.g., circuit(s)), software or manual means. Examples of these processes will be described below with respect to embodiments of the system, but embodiments are not limited thereto. The flow charts described herein do not imply a fixed order to the steps, and embodiments of the present invention may be practiced in any order that is practicable.

Turning to FIG. 2, a lighting device 10 including a phosphor material radiationally coupled to a light source is provided, according to some embodiments of the present disclosure. As used herein, the terms "lighting device," "light emitting assembly" and "lamp," may be used interchangeably. The lighting device 10 includes a semiconductor radiation source, shown as a light emitting diode (LED) chip 12 and leads 14 electrically attached to the LED chip 12. The leads 14 may be thin wires supported by a thicker lead frame 16 or the leads may be self-supported electrodes and the lead frame may be omitted. The leads 14 provide current to LED chip 12 and thus cause it to emit radiation.

The lighting device 10 may include any semiconductor blue or ultraviolet light source that is capable of producing white light when its emitted radiation is directed onto a phosphor material. In one embodiment, the semiconductor light source is a blue emitting LED emitting near 450 nm. The LED chip 12 may comprise a semiconductor diode based on any suitable III-V, II-VI, or IV-IV semiconductor layers and having an emission wavelength of about 250 to 550 nm. The LED chip 12 may be, for example based on a nitride compound semiconductor of formula $In_iGa_jAl_kN$ (where 0 is less than or equal to i; 0 is less than or equal to j; 0 is less than or equal to k and i+j+k=1) having an emission wavelength greater than about 250 nm and less than about 550 nm. More particularly, the LED chip 12 may be a near-UV or blue emitting LED having a peak emission wavelength from about 350 nm to about 500 nm. The radiation source is described herein as an LED for convenience. However, as used herein, the term is meant to encompass all semiconductor radiation sources including, e.g., semiconductor laser diodes. Further, although the general discussion of the exemplary structures of the invention discussed herein is directed toward inorganic LED based light sources, it should be understood that the LED chip may be replaced by another radiation source unless otherwise noted and that any reference to semiconductor, semiconductor LED, or LED chip is merely representative of any appropriate radiation source, including, but not limited to, organic light emitting diodes.

In lighting device 10, a layer 22 including a red/far-red emitting phosphor is disposed on a surface of the LED chip 12, and is radiationally coupled to the chip 12. In one or more embodiments, the layer 22 includes the red/far-red emitting phosphor that emits in a wavelength range from 600 nm to 800 nm, as described herein. The layer 22 can be deposited on the LED 12 by any appropriate method known in the art. For example, a water-based suspension of the phosphor(s) can be formed, and applied as a phosphor layer to the LED surface. In one such method, a silicone slurry in which the phosphor particles are randomly suspended is placed around the LED. This method is merely exemplary of possible positions of the layer 22 and the LED 12. Thus the layer 22 may be coated over or directly on the light emitting surface of the LED chip 12 by coating and drying a phosphor suspension over the LED chip 12. In the case of a silicone-based suspension, the suspension is cured at an appropriate temperature.

In one or more embodiments, the LED chip 12 may be encapsulated within an envelope 18, which encloses the LED chip 12 and an encapsulant material 20. Both the envelope 18 and the encapsulant material 20 should be transparent to allow emitted light to be transmitted through those elements. The envelope 18 may be, for example, glass or plastic. The LED chip 12 may be enclosed by the encapsulant material 20. The encapsulant material 20 may be a low temperature glass, or a thermoplastic or thermoset polymer, or resin as known in the art, for example, a silicone or epoxy resin. In an alternate embodiment, the lighting device 10 may only comprise the encapsulant material 20 without the envelope 18.

Figure 4:
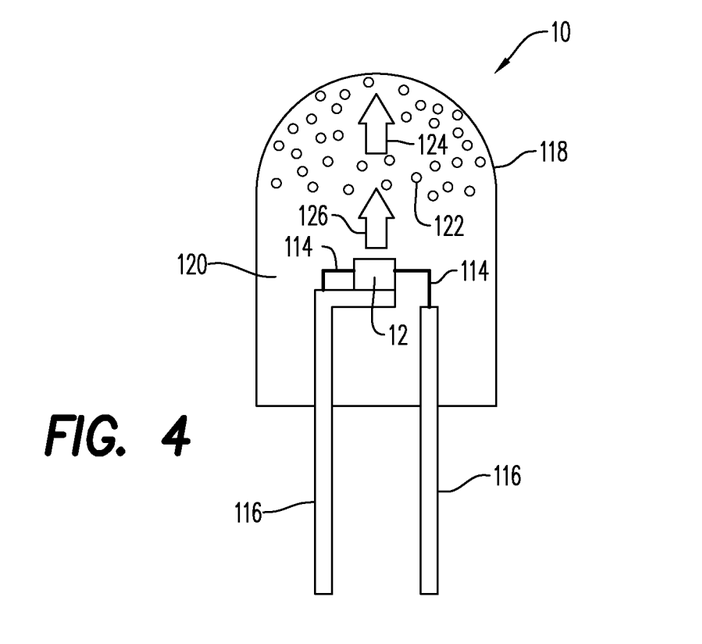
FIG. 4 is a second non-exhaustive example of a lighting device according to some embodiments.

Various structures of the lighting device 10 are known in the art. For example, in some embodiments, the red/far-red emitting phosphor 22 (that, in one embodiment, is disposed on a surface of the chip 12 in FIG. 2) may alternatively be interspersed within the encapsulant material 120, as shown in FIG. 4 as 122, instead of being disposed directly on the LED chip 12. The phosphor material 122 (in the form of a powder) may be interspersed within a single region of the encapsulant material 120 or throughout the entire volume of the encapsulant material. Blue light, not shown in FIG. 2, but shown as 126 and 226 in FIGS. 4 and 5, respectively, emitted by the LED chip mixes with the light emitted by the red/far-red emitting phosphor 22/122/222 to produce desired emission (indicated by arrow 24 in FIG. 2, 124 in FIG. 4, and 224 in FIG. 5). If the phosphor material 122 is to be interspersed within the material of encapsulant 20, then a phosphor powder may be added to a polymer or silicone precursor, and then the mixture may be cured to solidify the polymer or silicone material. Examples of polymer precursors include thermoplastic or thermoset polymers or a resin, for example epoxy resin. Other known phosphor interspersion methods may also be used, such as transfer loading.

Figure 5:
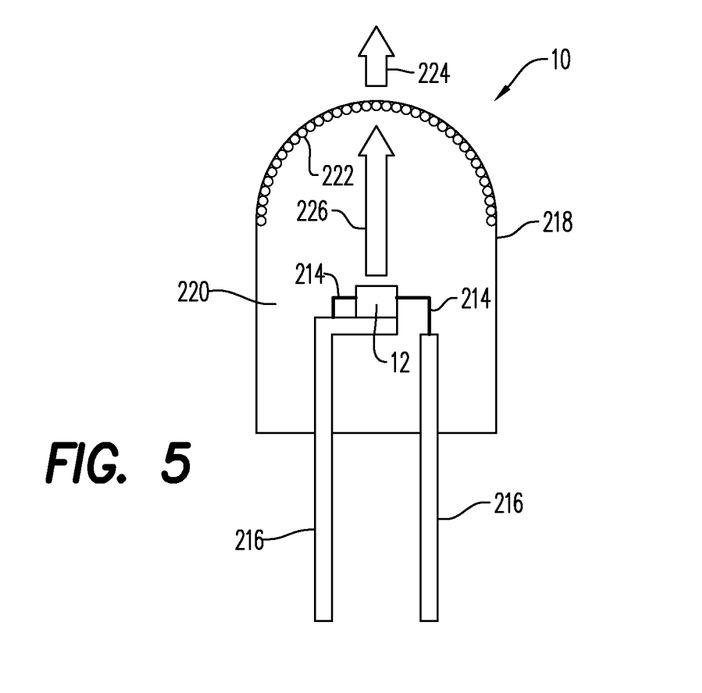
FIG. 5 is a third non-exhaustive example of a lighting device according to some embodiments.

In some other embodiments, the red/far-red emitting phosphor may be coated onto a surface of the envelope 218, as shown in FIG. 5, instead of being disposed on the LED chip 12. The phosphor material 222 is preferably coated on the inside surface of the envelope 218, although the phosphor may be coated on the outside surface of the envelope 218, if desired. Phosphor material 222 may be coated on the entire surface of the envelope or only a top portion of the surface of the envelope. The UV/blue light emitted by the LED chips 12 mixes with the light emitted by the phosphor material, and the mixed light is emitted in the desired wavelengths. Of course, the phosphor material may be located in any two or all three locations or in any other suitable location, such as separately from the shell or integrated into the LED.

Figure 7:
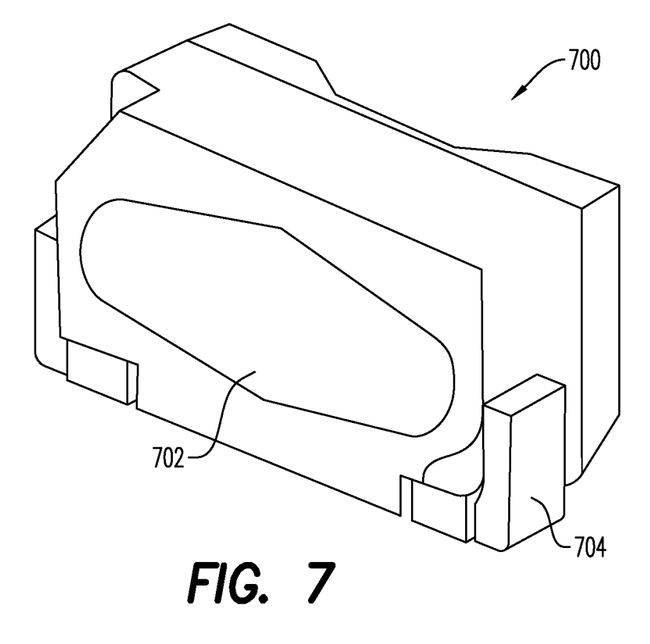
FIG. 7 is a fourth non-exhaustive example of a lighting device according to some embodiments.

Another structure (particularly for backlight applications) is a surface mounted device ("SMD") type light emitting diode 700 e.g., as shown in FIG. 7. This SMD is a "side-emitting type" and has a light-emitting window 702 on a protruding portion of a light guiding member 704. An SMD package may comprise an LED chip as described herein, and a phosphor material that includes a coated phosphor according to the present invention. Other backlight device include, but are not limited to, TVs, computers, and hand-held devices such as smartphones and tablet computers.

Moreover, in some embodiments, a lighting device may include a plurality of LED chips. These various structures discussed with respect to FIGS. 2/4/5/7 may be combined, with the red/far-red emitting phosphor or a blend including the red/far-red emitting phosphor located in any two or all three locations or in any other suitable location, such as separately from the envelope or integrated into the LED chip. Further, different phosphor blends may be used in different parts of the structure.

In any of the above structures, the lighting device 10 may also include a plurality of particles (not shown) to scatter or diffuse the emitted light. These scattering particles are generally embedded in the encapsulant 20/120/220. The scattering particles may include, for example, particles made from alumina ($Al_2O_3$) or titania ($TiO_2$). The scattering particles may effectively scatter the light emitted from the LED chip 12, preferably with a negligible amount of absorption.

Turning to FIG. 3, a process 300 for emitting wavelengths in the desired range is provided. The process 300 may apply to any of the above-described structures. Regarding the lighting devices 10 shown in FIGS. 2, 4, 5, the LED chip 12 emits a light in S310 at a first wavelength. In one or more embodiments, the light emitted by the LED chip 12 may be in the blue range (e.g., 400 to 470 nm), or any other suitable range. The emitted light having the first wavelength is received and absorbed by the phosphor 22/122/222 in S312. In particular, in one or more embodiments, the phosphor 22/122/222 absorbs one or more photons of light at the first wavelength. Then in S314, the phosphor 22/122/222 converts the photon(s) of light from the first wavelength into photons of light having a second wavelength, wherein the second wavelength is different from the first wavelength. The photons of light having the second wavelength are then emitted from the phosphor at S316, as indicated by the arrow 24 in FIG. 2, by 124 in FIG. 4, and by 224 in FIG. 5. Next, the emitted photons of light having the second wavelength are received by a plant in S218.

A phosphor may generate multiple wavelengths, some of which may be more useful for a particular purpose than others. The wavelengths emitted by the phosphor that are not used for the particular purpose may be wasted as they are emitted but not being used for the purpose. The inventors note that a phosphor, including a particular activator ion, may be selected based on the desired emitted photons of light having the second wavelength, such that the bulk of the light emitted is in the desired range and not wasted. As a non-exhaustive example, consider the emission spectrum of BaAlF5:Sm2+(FIG. 1) and its overlap with the plant absorption spectrum as exhibited in FIG. 6. In the emission spectrum, peak #1 occurs at 679 nm, peak #2 occurs at 691 nm and peak #3 occurs at 720 nm. The first two peaks are more efficient in stimulating the plant photoreceptor known as PR, while peak #3 is more efficient in stimulating plant photoreceptor $P_{FR}$. Thus, the plant may use all of the output wavelength of the phosphor.

Prior to the start of the process 300, a user may select a phosphor (and radiation source) based on the desired emitted wavelength by the phosphor, in one or more embodiments. This may be referred to as tuning the wavelengths for optimizing the system. The phosphor or host of the activator ion may be tuned to emit at various wavelengths. For example, if a particular tomato plant better utilizes wavelengths in a range that is less deep red, a phosphor that outputs the wavelength in this range may be selected. In one or more embodiments, the user may select an LED that emits wavelengths having a particular range to use with a particular phosphor compound, so that the user may select at least one of the phosphor compound and LED range, to emit a desired wavelength. It is further noted that it may be desirable to use other wavelengths for other purposes. For example, another wavelength may be desirable to destroy pathogens or pests, and therefore including a violate range of 350-475 as an output of the LED may be important to use with a phosphor including the activator ion, as not all of the LED emission is absorbed by the phosphor and some bleeds through the powder, providing multiple wavelength emissions.

The inventors note that plants may utilize wavelengths outside of the red/far-red region in addition to the red/far-red wavelengths. As a non-exhaustive example, plants typically require red/deep-red wavelengths for flower growth, and blue wavelengths for vegetative growth. To that end, in one or more embodiments, the lighting device 10 may further include a second phosphor ("additional phosphor") in addition to the red/far-red emitting phosphor. Blending the two or more phosphor compounds may allow for the use of one LED, instead of mounting multiple LEDs (e.g., a red LED and a blue LED). In some embodiments, a phosphor blend including the red/far-red emitting phosphor and a second phosphor may be used in the lighting device 10. In one embodiment, the second phosphor may have a peak emission in a wavelength range from about 480 nanometers to about 650 nanometers. The additional phosphor may be a green-emitting phosphor, a yellow-emitting phosphor, a green-yellow emitting phosphor or a combination thereof. Suitable examples of the additional phosphors are $Ce^{3+}$ activated garnets and $Eu^{2+}$ activated oxides, $Eu^{2+}$ activated nitrides and $Eu^{2+}$ activated oxynitrides.

The additional phosphors listed above are not intended to be limiting. Any other phosphors, commercial and non-commercial, that form non-reactive blends with the red/far-red emitting phosphor may be used in the phosphor blend, and are considered within the scope of the present techniques. Furthermore, some additional phosphors may be used, e.g., those emitting in a spectrum region suitable for plant growth, at wavelengths substantially different from those of the phosphors described herein. These additional phosphors may be used in the blend to customize the white color of the resulting light, and to produce sources with improved light quality for desired plant growth.

When the phosphor material includes a blend of two or more phosphors, the ratio of each of the individual phosphors in the phosphor blend may vary depending on the characteristics of the desired light output, for example color temperature. The relative amounts of each phosphor in the phosphor blend can be described in terms of spectral weight. The spectral weight is the relative amount that each phosphor contributes to the overall emission spectrum of the lighting device. The spectral weight amounts of all the individual phosphors and any residual bleed from the LED source may add up to 100%.

EXAMPLES

The examples that follow are merely illustrative, and should not be construed to be any sort of limitation on the scope of the disclosure.

Starting materials: 3.0344 grams $BaF_2$, 1.6034 grams $AlF^3$ and 0.3987 grams $SmF_3$ were intimately ball milled. The combined ball milled powder was then heated at 825° C. for ten hours under forming gas containing 0.5% $H_2$ to form the final product phosphor $(Ba_{0.9}Sm_{0.1})AlF_5$.

The product phosphor $(Ba_{0.9}Sm_{0.1})AlF_5$, as synthesized, was sieved through 325 mesh and was then characterized for its luminescence properties. The excitation-emission spectra of the product phosphor $(Ba_{0.9}Sm_{0.1})AlF_5$ are illustrated in FIG. 1. The phosphor $(Ba_{0.9}Sm_{0.1})AlF_5$ emits in the wavelength range from 650 nm to 750 nm and has peak emission at 669 nm.

The flowchart and block diagrams in the Figures illustrate the architecture, functionality, and operation of possible implementations of systems and methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A lighting device, comprising:
an LED light source; and
a phosphor radiationally coupled to the LED light source, the phosphor for emitting red and far red light within a wavelength range from about 600 nm to about 800 nm, wherein the phosphor comprises a host material activated with an activator ion, and wherein the activator ion comprises at least one of $Sm^{2+}$ and $Mn^{2+}$.

2. The lighting device of claim 1, wherein the lighting device is a horticulture lighting device.

3. The lighting device of claim 1, wherein the activator ion further comprises at least one of $Mn^{4+}$, $Eu^{2+}$, and $Cr^{3+}$.

4. The lighting device of claim 3, wherein the activator ion in the phosphor is $Mn^{4+}$ or $Cr^{3+}$ activated alumina.

5. The lighting device of claim 1, wherein the host material is at least one of an oxide, a fluoride, an oxyfluoride, a nitride, an oxynitride, a sulfide, an oxysulfide, selenide, an oxyselenide, phosphates, borates, silicates, tungstates chlorides, bromides, oxyhalides, iodides, and a glass.

6. The lighting device of claim 1, wherein the phosphor emits light in a wavelength range from about 650 nm to about 750 nm.

7. The lighting device of claim 1, wherein the phosphor has peak emission at a wavelength in a range from about 650 nm to about 720 nm.

8. The lighting device of claim 1, wherein the activator ion further comprises $Eu^{2+}$ and one or more of $Mn^{2+}$ and $Cr^{3+}$.

9. The lighting device of claim 1, wherein the activator ion further comprises $Cr^{3+}$ and $Mn^{4+}$.

10. The lighting device of claim 1, wherein the host material comprises a fluoride and the activator ion comprises $Sm^{2+}$.

11. The lighting device of claim 10, wherein the phosphor is $Sm^{2+}$ activated $BaAlF_5$.

12. The lighting device of claim 1, wherein the phosphor has a quantum efficiency greater than 70 percent.

13. The lighting device of claim 1, further comprising an additional phosphor having a peak emission in a wavelength range from about 480 nanometers to about 650 nanometers.

14. The lighting device of claim 13, wherein the additional phosphor comprises $Ce^{3+}$ activated garnets, $Eu^{2+}$ activated nitrides, $Eu^{2+}$ activated oxynitrides or a combination thereof.

15. The lighting device of claim 1, wherein the LED light source emits light in a wavelength range from about 350 nm to about 500 nm.

16. A lighting device comprising:
   an LED light source; and
   a phosphor radiationally coupled to the LED light source, the phosphor for emitting red and far red light within a wavelength range from about 600 nm to about 800 nm, wherein the phosphor comprises a host material activated with $Sm^2+$.

17. The lighting device of claim 16, wherein the phosphor has peak emission at a wavelength in a range from about 650 nm to 720 nm.

18. The lighting device of claim 16, wherein the lighting device is a horticulture lighting device.

19. The lighting device of claim 16, wherein the LED light source emits in a wavelength range from about 350 nm to about 625 nm.

* * * * *